Figure 3:
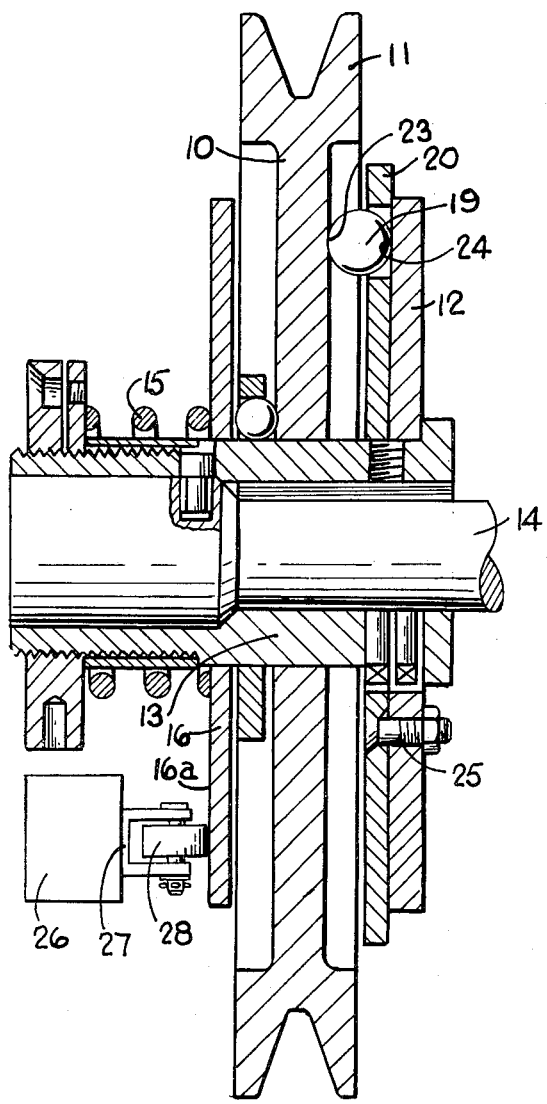

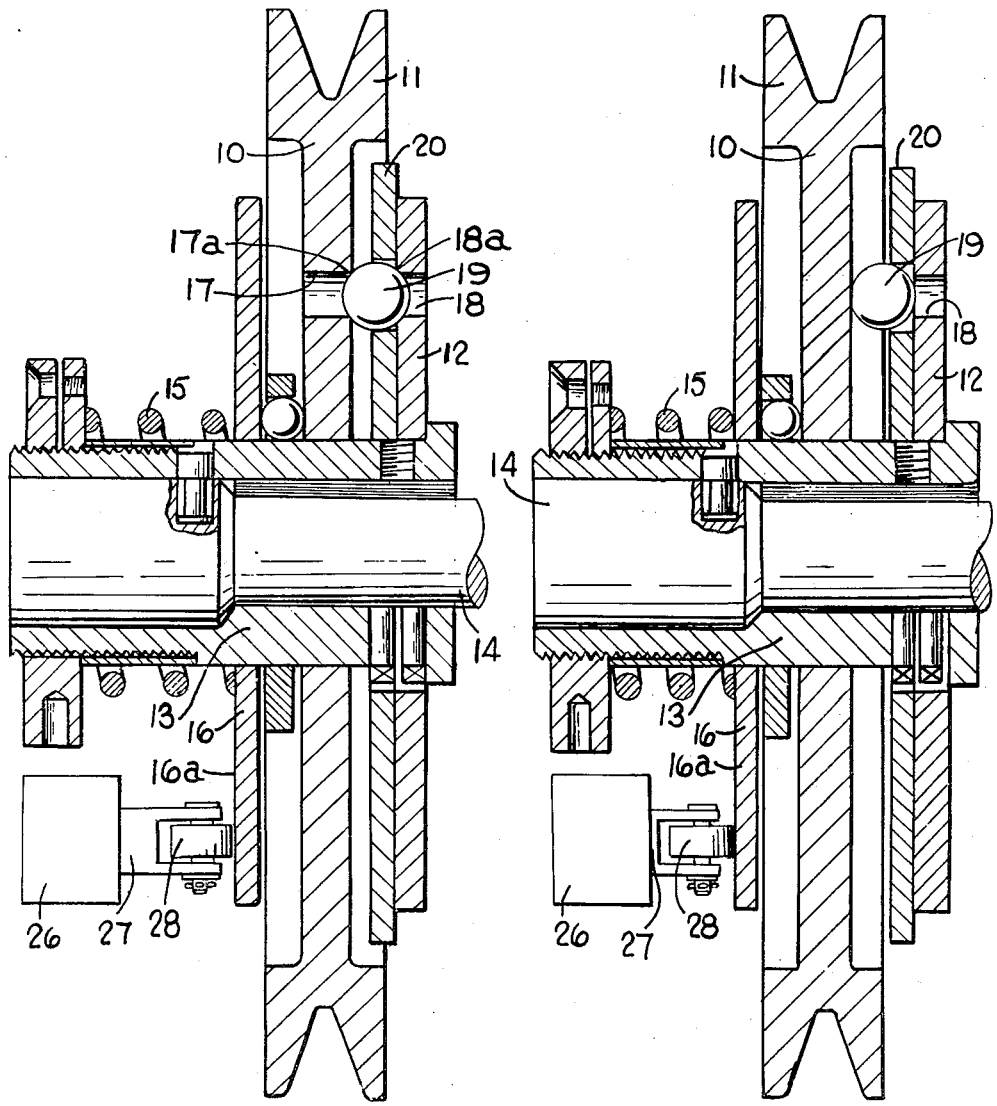

July 2, 1963 O. J. B. ORWIN 3,095,955
OVERLOAD CLUTCH OR TORQUE LIMITING DEVICE
Filed April 13, 1961 5 Sheets-Sheet 2

July 2, 1963   O. J. B. ORWIN   3,095,955
OVERLOAD CLUTCH OR TORQUE LIMITING DEVICE
Filed April 13, 1961   5 Sheets-Sheet 3

INVENTOR.
OLAF JOHN BARCLAY ORWIN
BY
AGENT

July 2, 1963  O. J. B. ORWIN  3,095,955
OVERLOAD CLUTCH OR TORQUE LIMITING DEVICE
Filed April 13, 1961  5 Sheets-Sheet 5

INVENTOR.
OLAF JOHN BARCLAY ORWIN
BY
Kurt Kelman
AGENT

United States Patent Office 3,095,955
Patented July 2, 1963

3,095,955
OVERLOAD CLUTCH OR TORQUE
LIMITING DEVICE
Olaf J. B. Orwin, Quinton, Birmingham, England, assignor to Fisher & Ludlow Limited, Tipton, England, a British company
Filed Apr. 13, 1961, Ser. No. 102,885
Claims priority, application Great Britain Apr. 14, 1960
4 Claims. (Cl. 192—56)

This invention relates to a new or improved overload clutch or torque limiting device for use in transmitting rotational movement, for example, the drive from an electric motor or other power unit to an endless conveyor element of a conveyor system, although it should be understood that the application of the invention is in no way restricted to such particular arrangement.

The invention is concerned with a torque limiting device or overload clutch herein referred to under the generic expression "overload clutch" of the kind comprising driving and driven clutch members, each having a plurality of ball positioning openings, a plurality of torque transmitting balls, the arrangement being such that when the clutch is transmitting torque, each ball is positioned partially within a driving member opening and also within a corresponding driven member opening, so as thereby to prevent relative rotation between the two clutch members, the two clutch members being mounted for relative axial displacement away from one another against spring or other loading, so as to permit of the balls disengaging from the positioning openings of at least one of the two clutch members and of the latter rotating relatively on more than a predetermined torque being applied to the driving clutch member.

In overload clutches of the foregoing kind, as hitherto constructed, when relative rotation between the two members occurs in the manner described, the balls which are no longer in engagement with the positioning openings of at least one of the two members, intermittently engage with the edges of the said openings of the now relatively rotating members, so as to subject these edges to continued impact, with the result that if relative rotation of the two members is allowed to continue for any appreciable time, the edges of the ball receiving mouths of the openings are so damaged, that the clutch is rendered quite useless while in addition a considerable noise is developed by the continuous impacting of the balls on the said edges.

The present invention has for its object the provision of an improved arrangement in which the foregoing serious disadvantages of existing constructions of overload clutches of the foregoing kind is avoided.

According to the present invention, the clutch is provided with a ball retaining element comprising a plurality of ball retaining openings which are adapted on relative rotation occurring between the driving and driven clutch members, to receive and retain the balls in a position in which they are out of registration with both the driving and driven clutch member ball positioning openings.

Figure 4:
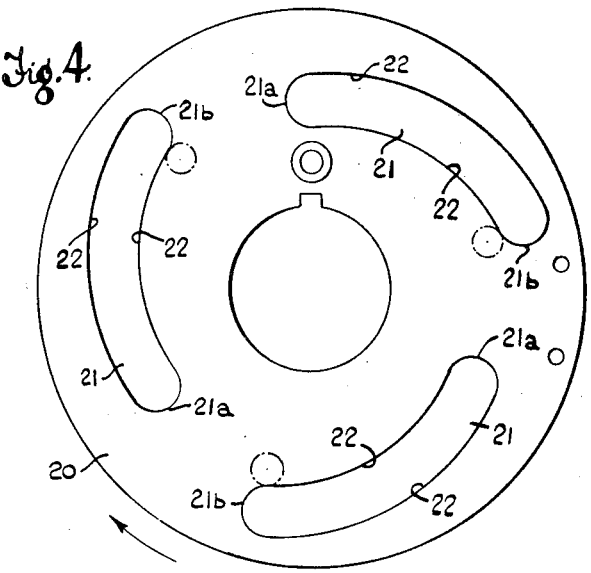
Figure 6:
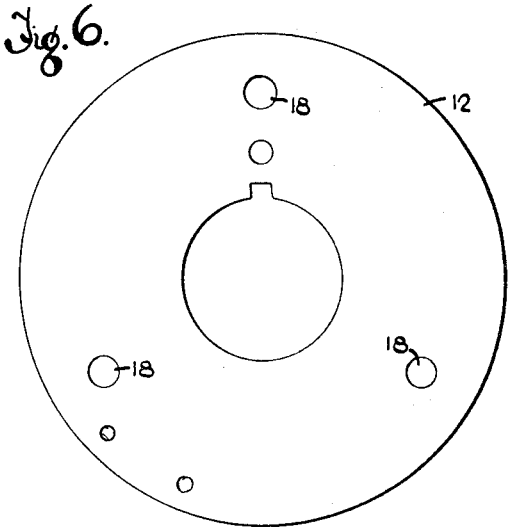
Figure 5:
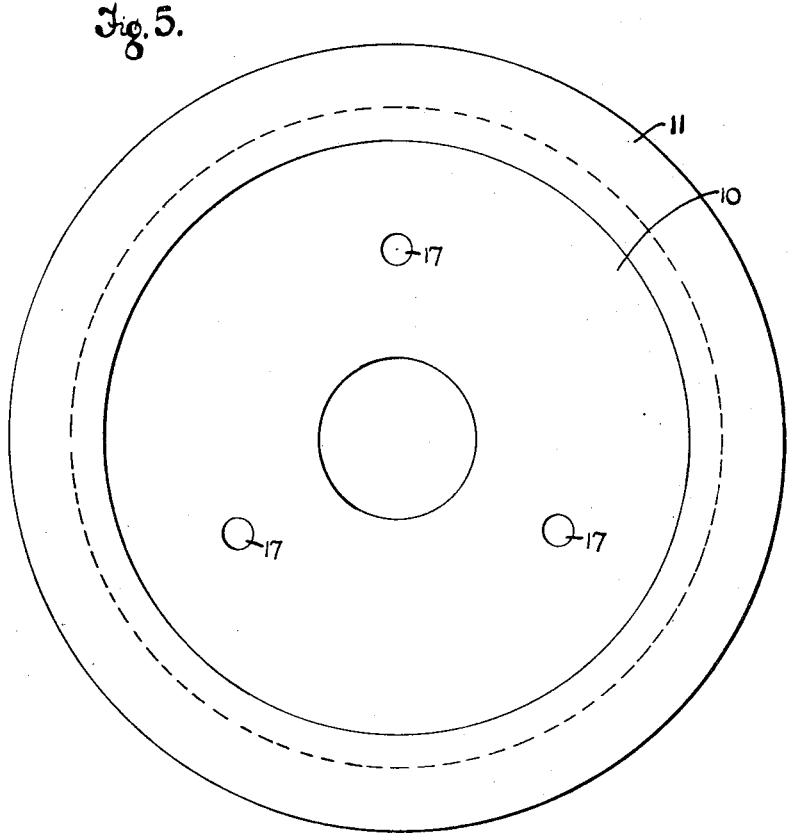
Figure 7:
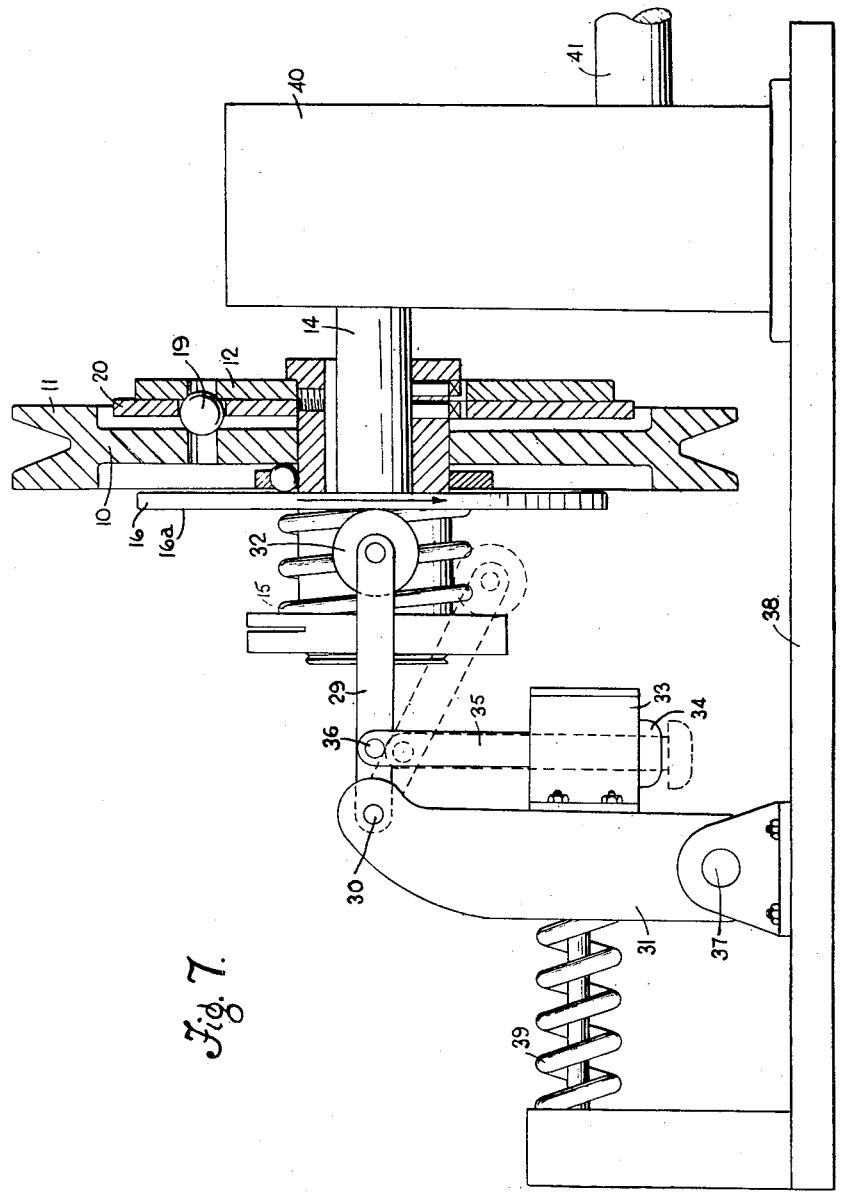

The invention is illustrated in the accompanying drawings, wherein:

FIGURE 1 is a sectional side elevation of one form of overloading in accordance with the present invention, the parts being depicted with the clutch in the engaged or torque transmitting condition, FIGURE 2 is a view similar to FIGURE 1, but showing the relative position of the parts when the clutch has just moved into the disengaged position and the driving member of the clutch has just commenced to overrun the driven member, FIGURE 3 is a view similar to FIGURE 2, but showing the position of the parts immediately after the commencement of the overrunning of the driving member, in which the torque transmitting balls are disposed in an inoperative position out of register with the positioning openings of the driving and driven clutch members, FIGURE 4 is an end elevation of the ball retaining element of the clutch depicted in FIGURE 1, FIGURES 5 and 6 are end elevations depicting respectively the driving and driven members of the clutch depicted in FIGURE 1, FIGURE 7 is a part sectional side elevation illustrating a further embodiment of the invention.

Referring firstly to FIGURES 1 to 6 of the drawings, the overload clutch there illustrated comprises a driving member 10 which is constituted by the web of belt pulley 11 which is adapted to be driven by a belt drive in the conventional manner, not shown.

The driven member 12 of the clutch is formed by a plane annular disc mounted non-rotatably upon one end of a sleeve-like hub 13, which is keyed to a driven shaft 14 to which the drive is required to be transmitted through the clutch from pulley 11.

On the opposite end of this hub 13 is mounted a helically coiled compression spring 15, which, through a ball type thrust plate 16 of known form has thrust engagement with the adjacent end face of the driving member 10, which driving member is axially slidable on the periphery of hub 13.

The driving and driven clutch members 10, 12, are formed with a corresponding number of ball positioning openings 17, 18 respectively, each constituted by axially extending through holes, of circular configuration, the holes, as shown in FIGURES 5 and 6 being each of the same identical bore, and being all disposed at the same radial distance from the axis of rotation of the clutch and being spaced symmetrically there around. As shown three such holes 17, 18, are provided in each clutch member with a corresponding number of, namely, three, identical torque transmitting balls 19.

Each ball has a diameter somewhat larger than the diameter of the ball positioning holes 17, 18, for example, in one preferred arrangement, each ball may have a diameter of ½", with the bore of the ball positioning holes 17, 18, $^{11}/_{32}$". Thus, as shown in FIGURE 1, and as more particularly explained hereinafter, the balls are incapable of fully entering the holes 17, 18, although, as shown in FIGURE 1, they can extend by a short distance within the adjacent mouths of the said holes 17, 18, when these are in register with one another in a position in which the periphery of the balls is in engagement with the circular edges 17a, 18a respectively of the circular holes 17, 18, respectively.

Mounted removably but non-rotatably on the hub between the driving and driven members is a ball retaining element 20, in the form of a plane annular disc.

This ball retaining element 20 is formed with three ball retaining openings 21, each in the form of a closed ended slot (see FIGURE 4), one such slot being provided for each ball 19, and when the parts are assembled together each ball is disposed permanently within one of the three slots 21.

As shown in FIGURE 4, the slots 21 are similar to one another and are spaced symmetrically around the axis of the clutch, namely, the axis of shaft 14. Each slot 21 has a width slightly greater than the diameter of each ball 19, so that each ball can move freely along the length of its assembled slot. The three slots extend in a generally circumferential direction but, as shown in FIGURE 4, are somewhat inclined to such direction so that one end 21a of each slot is situated nearer to the clutch axis than the opposite end 21b.

Each slot 21 is similarly inclined in the same circumferential direction with the radially inner end 21a of each slot at a position medially between the two lateral, i.e. circumferentially extending edges 22 of the slot in register with the centre of a ball positioning opening 18 of the driven clutch member 12.

Each slot 21, in a direction from said inner in-register end 21a thereof, is in the designed direction of rotation of the driven member 12, namely, that denoted by the arrow in FIGURES 4 and 6, inclined outwardly of the clutch axis in a direction towards the opposite, i.e. outer end 21b of the slot.

The arrangement is such that the outer end 21b of each slot is located by such a greater radial distance from the clutch axis than that of the inner end 21a of the slot as will be apparent from FIGURE 4 as to be inherently incapable of being brought into register with the ball positioning openings of the driving member 10. To more fully explain this, in FIGURE 4 there has been drawn in dotted outline the relative position of the holes 17 of the driving member when these are in a position which is nearest to the outer end 21b of the longer of the three slots.

The retaining element 20 has an axial thickness less than the radial dimension of each torque transmitting ball 19 so that when, as shown in FIGURE 1, the clutch is transmitting torque, namely, from the belt pulley 11 to the shaft 14, the holes 17, 18 of the driving and driven members 10, 12, respectively, and which constitute the ball positioning openings, are in register with one another with their mouths each receiving one of the two axially opposite end portions of one of the three torque transmitting balls 19. In this position the peripheries of the axially opposite end portions of the balls 19 are in pressure engagement with the circumferential edges 17a, 18a of the adjacent mouths of the holes 17, 18 respectively into each of which mouths the balls partially extend as clearly shown in FIGURE 1.

In this clutch engaging position depicted in FIGURE 1, the compression spring 15, acting on thrust plates 16, thrusts the driving member 10 towards the driven member 12, so as to maintain the edges 17a, 18a of the said holes 17, 18 in hard pressure engagement with the periphery of the balls 19, thereby enabling torque to be transmitted from the driving member 10 through the three balls 19 to the driven member 12.

The torque transmitted from the driving member 10 to the driven member 12 through the balls 19 produces an axially directed reaction thrust between the balls and the driving and driven members, proportional to the transmitted torque and which is resisted by the pressure of spring 15, but when the transmitted torque exceeds a predetermined value, the reaction thrust proportional thereto, is sufficient to overcome the pressure of spring 15, whereupon the driving member 10 commences to move axially away from the driven member 12 into an initial disengaging position in which the ball positioning holes 17, 18 are still in register with one another, but their edges 17a, 18a are no longer in hard pressure engagement with the balls 19.

Thus, the driving member 10 is now free to commence to overrun the driven member 12 under the torque which its associated pulley 11 continues to transmit to the driving member.

As the driving member commences to overrun the driven member, namely, in the direction of the arrow in FIGURE 4, corresponding to the designed direction of rotation of the clutch, the driving member holes 17 will commence to move out of register with the driven member holes 18 and the edges 17a of these holes will momentarily again have pressure engagement with the balls 19, tending to displace the balls in the direction of rotation of the driving member, namely, in the direction of the arrow in FIGURE 4, i.e. from the inner ends 21a of the respective slots towards their outer ends.

As this relative movement commences, the resultant pressure between the balls 19 and the edges of the holes 17, 18 which are moving out of register with one another, will cause the driving and driven members to move relatively further apart into the initial clutch disengaged position depicted in FIGURE 2, in which the opposed faces of the driving and driven members 10, 12 are spaced from one another by a distance equal to the diameter of the balls 19. Thus the latter will now be fully disengaged from the edges 17a, 18a of the holes 17, 18 and the driving member 10 is completely free to overrun the driven member 12 in the direction of the arrow in FIGURE 4. In FIGURE 2, the balls 19, are depicted opposite to the holes 18, although in this position of the parts, the balls will have commenced to have advanced slightly along the slots 21, but for simplicity in drawing, the balls have been shown in FIGURE 2 as being still opposite to the holes 18.

As the balls 19 have been rotating about the axis of shaft 14 in the direction of the arrow in FIGURE 4, they will possess momentum in such direction, and will accordingly advance along the slots 21 to the outer ends 21b thereof, being assisted in such movement by having rolling engagement with the adjacent end face 23 of the driving member at a position between the pitch circle of the holes 17 and the outer periphery of the driving member 10. Thus the parts move into the fully inoperative or final clutch disengaged position depicted in FIGURE 3, in which the balls 19 are disposed in a position in which they are completely out of register with the holes 17, 18.

So long as the driving member 10 continues to overrun the driven member 12, the balls remain in the position depicted in FIGURE 3, each adjacent the outer end 21b of its corresponding slot, with the balls in rolling engagement with the driving member face 23 and the adjacent end face 24 of the driven member 12, the balls being held in pressure engagement with these two faces 23, 24 by the pressure which the spring 15 continues to exert.

Insofar as this rolling engagement between the balls 19 and the plane end faces 23, 24 of the driving and driven clutch members does not subject these parts to anything more than simple rolling contact, the construction necessarily avoids the serious disadvantage of the existing form of overload clutch of the foregoing kind as earlier described.

The balls 19 remain in the position depicted in FIGURE 3 until the driving member 10 is brought to rest, whereupon the operator can now reset the clutch for further torque transmission by turning the two clutch members 10, 12 respectively in a direction opposite to the arrow in FIGURE 4, so as thereby to displace the balls back to the inner ends 21a of their respective slots in which they are in register with the driven member holes 18, whereupon as soon as the driving member 10 has been turned relatively to bring its holes 17 in register with the holes 18, the parts resume the clutch engaged position depicted in FIGURE 1 under the pressure exerted by spring 15.

The ball retaining element 20 is of symmetrical form on each of two opposite sides and is connected detachably to the driven member 12 by means of one or more connecting bolts, one of which is depicted at 25 in FIGURE 3, while the retaining element is further slidably keyed to the hub 13.

Accordingly, in the event of the direction of rotation of the clutch being opposite to that depicted by the arrow in FIGURE 4, the retaining element may be reversed from that position, so as to ensure that in the event of the driving member overrunning the driven member, the balls 19 are free to move in the direction of overrunning of the driving member from the inner ends to the outer ends of their respective slots 21.

The above described disengaging movement of the driving member 10 in which it advances axially along the hub 13 away from the driven member 12, results in a corresponding displacement of the thrust plate 16, and this displacement may, as shown in FIGURES 1 and 2, be utilised to operate a cutoff switch 26, the operating member 27 of which is provided with a roller 28 which has rolling engagement with the outer end face 16a of thrust plate 16, the member 27 being displaced by such axial movement of the thrust plate to actuate the switch 26 which would thereby in the known manner, serve to cut off the power source such as the driving electric motor, it being understood that by reason of the momentum possessed by the parts, the driving member 10 would still overrun the driven member so as to advance into the position depicted in FIGURE 3 as above described.

The overload clutches as above described, are often required to transmit drives to machinery starting from rest, and the starting torque will of course be greater than the normal maximum running torque, and if the difference between the starting torque and the running torque is substantial, say of the order of 20% or more, and it is desired that the overload clutch shall operate under normal running conditions at torques more than about this figure of 20% in excess of the running torque, provision may be made for rendering the overload clutch temporarily inoperative during the starting of the machinery, so as to preclude undesired disengagement of the clutch under the higher starting torque.

One such arrangement for the foregoing purpose is depicted in FIGURE 7, wherein the clutch of the same construction as that shown in FIGURES 1 to 6, is provided with means for positively retaining the driving member 10 in the engaged position as shown in FIGURE 1.

Such means comprises the provision of a locking arm 29 arranged so as to extend at one side of spring 15, the locking arm having one end thereof mounted for pivotal movement about a horizontal axis at 30 on upstanding bracket 31, the free end of the arm 29 carrying roller 32 which engages with the outer face 16a of thrust plate 16. For the direction of rotation of the parts, including thrust plate 16 shown by the arrow in FIGURE 7, the arm 29 would be urged with the assistance of gravity, normally into the inoperative position depicted in dashed outline in this figure, from the full outline operative position.

The arm is adapted to be displaced positively into the operative position by solenoid 33, the armature 34 of which is mounted on rod 35 pivoted at 36 to the arm 29, so as on energisation of the solenoid to lift the arm 29 from the inoperative position depicted in dashed outline to the horizontal full line operative position, so as thereby to prevent clutch disengagement, such energisation of the solenoid being arranged to occur only on the starting of the machinery, for example, by connecting the solenoid to the starter controlling the main electric driving motor, so that as soon as the driving motor has reached full driving speed, the solenoid 33 is de-energised and the locking arm 29 moves into the disengaged position to permit of the overload clutch operating in the manner already described.

For safety purposes, for example, to take care of the case of some bearing of the driven machinery being seized, so as positively to prevent rotation of the driven member 12 of the clutch, the bracket 31 may be pivoted at 37 to a supporting base 38 so as to be free to swing with its associated locking arm 29 in a direction away from the thrust plate 16, such swinging movement being normally resisted by compression spring 39, the strength of which is such that the spring 39 is compressed to permit of the above swinging movement of the bracket 31 only in the event of the torque transmitted through the clutch on starting being appreciably in excess of the maximum anticipated normal starting torque of the machinery. Such supporting base 38 may, as shown, support a gear box 40, through which the drive is transmitted from shaft 14 to an output shaft 41.

What I claim then is:
1. An overload clutch comprising
   (a) a driving clutch member;
   (b) a driven clutch member, said members being rotatable about a common axis and having
   (c) opposed plane faces, said faces defining
   (d) two like sets of ball receiving bores, all of said bores having the same radial distance from said axis and said sets of bores being in register with one another in one relative rotational position of the two clutch members;
   (e) a plurality of torque transmitting balls each of a diameter greater than the diameter of said ball receiving bores at said faces;
   (f) means yieldingly urging said opposed faces towards one another whereby said balls are in torque transmitting engagement with two registering ones of said bores when the two sets of bores are in said one relative rotational position;
   (g) a ball retaining means rotatable with one of said clutch members and arranged between said opposed faces, said ball retaining means defining
   (h) a plurality of ball retaining slots, said slots each having one part at the same radial distance from said axis as said bores and another part at a different radial distance from said axis whereby said other part of the slots is out of register with the bores at all relative rotational positions of the clutch members, and said balls being freely advanceable along said slots when the balls are out of torque transmitting engagement with said bores.

2. The overload clutch of claim 1, wherein said ball retaining means is a plate connected to the driven clutch member for rotation therewith and wherein the ball retaining slots are of a width exceeding the diameter of the balls, the one part of the slots being in register with a corresponding bore in the face of the driven clutch member and the other part of the slots having a greater radial distance from said axis than the one parts.

3. The overload clutch of claim 1, wherein said ball receiving bores extend from said faces through the entire width of said clutch members.

4. The overload clutch of claim 1, wherein said clutch members are slidable along said axis, said yieldingly urging means including first spring means,
   (i) a clutch holding member displaceable between an inoperative position and a holding position, the holding member inhibiting relative sliding apart of the clutch members in said holding position, and
   (j) second spring means responsive to a clutch disengaging pressure for yieldingly retaining said holding member in its operative position.

References Cited in the file of this patent
UNITED STATES PATENTS

| 2,969,132 | Stewart | Jan. 24, 1961 |
| 2,969,133 | Langheck | Jan. 24, 1961 |

FOREIGN PATENTS

| 398,157 | Germany | Mar. 1, 1922 |